US010096177B2

(12) United States Patent
Nishino

(10) Patent No.: US 10,096,177 B2
(45) Date of Patent: Oct. 9, 2018

(54) ELECTRONIC CONTROL UNIT

(71) Applicant: DENSO CORPORATION, Kariya, Aichi-pref. (JP)

(72) Inventor: Eisuke Nishino, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/990,006

(22) Filed: Jan. 7, 2016

(65) Prior Publication Data
US 2016/0203654 A1    Jul. 14, 2016

(30) Foreign Application Priority Data

Jan. 14, 2015    (JP) .................. 2015-005004

(51) Int. Cl.
*G01M 17/00* (2006.01)
*G06F 19/00* (2018.01)
*G07C 5/08* (2006.01)
*G07C 5/02* (2006.01)
*B60W 10/00* (2006.01)

(52) U.S. Cl.
CPC .............. *G07C 5/08* (2013.01); *B60W 10/00* (2013.01); *G07C 5/02* (2013.01); *G07C 5/0825* (2013.01); *G07C 5/085* (2013.01)

(58) Field of Classification Search
CPC ................. G07C 5/08; G07C 5/0808
See application file for complete search history.

(56) References Cited

U.S. PATENT DOCUMENTS

| 2004/0083071 A1* | 4/2004 | Sawaoka ............... G01M 15/04 702/113 |
| 2009/0281689 A1 | 11/2009 | Suganuma et al. |
| 2011/0304448 A1* | 12/2011 | Kawamura .......... G07C 5/0808 340/438 |
| 2015/0032326 A1* | 1/2015 | Fushiki .................. B60K 6/365 701/32.1 |

FOREIGN PATENT DOCUMENTS

| JP | 2004-142556 A | 5/2004 |
| JP | 2004-151021 A | 5/2004 |

* cited by examiner

*Primary Examiner* — Imran K Mustafa
(74) *Attorney, Agent, or Firm* — Posz Law Group, PLC

(57) ABSTRACT

An electronic control unit improves a serviceability for a user of a vehicle by performing an abnormality diagnosis of the vehicle based on (i) storing a readiness information indicating that readiness is complete in a readiness storage, (ii) storing a history of normal diagnosis results from an abnormality diagnosis in a history storage, and (iii) relaxing a readiness complete condition for storing the readiness information in the readiness storage under control of a microcomputer, when the history stored in the history storage includes information of existence of the normal history. By using the relaxed condition for the abnormality diagnosis, readiness information is more quickly stored when performing the abnormality diagnosis. Also, diagnostic process is completed more quickly, facilitating the repair process and enabling the user to more quickly receive a desired service.

13 Claims, 7 Drawing Sheets

ELECTRONIC CONTROL UNIT

CROSS REFERENCE TO RELATED APPLICATION

The present application is based on and claims the benefit of priority of Japanese Patent Application No. 2015-005004, filed on Jan. 14, 2015, the disclosure of which is incorporated herein by reference.

TECHNICAL FIELD

The present disclosure generally relates to an electronic control unit capable of performing an abnormality detection process for detecting an abnormality of a vehicle.

BACKGROUND INFORMATION

Generally, a vehicle nowadays has many electronic control units (ECU)s installed in the vehicle, and among those ECUs, some have a self-diagnosis function for diagnosing an abnormality of the vehicle, which may be designated as On-Board Diagnostics (OBD). In recent years, OBD II standard is enacted, which is applicable to most of gasoline-engine vehicles and diesel-engine vehicles. According to the OBD II standard, the abnormality of the vehicle and the vehicle parts are diagnosable based on a regular monitoring of critical components and other conditions, such as an engine, an exhaust gas and the like.

The ECU stores information indicative of abnormality of a vehicle to a memory unit when diagnosis items are diagnosed as abnormal, based on information of various sensors that are installed in a vehicle, which is then read out by an external device installed in a gas station or the like. The read-out information is utilized for an abnormality check or the like. See for example, a patent document, Japanese Patent Laid-Open No. 2004-151021 (patent document 1).

When the self-diagnosis function is not properly functioning, the abnormality of sensors is not appropriately diagnosable. Therefore, the function of the abnormal sensor is configured to also be diagnosable as is (i.e., as the sensor is installed in the vehicle), and the diagnosis results are stored in the memory unit.

For example, according to the OBD II standard, the abnormality diagnosis determination items and the abnormality diagnosis inspection items (i.e., designated as abnormality diagnosis items) are stored as readiness information in the memory unit when satisfied. In other words, when all items of the readiness information are satisfied, the vehicle is shippable from a factory, or is returnable to a user from a repair shop.

The readiness information is erasable (i.e., can be "cleared") by the external device according to the OBD II standard, which means the information is erasable from the memory unit. Here, the readiness information is considered as complete only after all abnormality diagnosis items are satisfied. The ease of satisfying an abnormality diagnosis item is different from item to item, and the time required for the determination of the diagnosis item also varies from item to item. In other words, a certain diagnosis item may take a very long time to be determined as satisfied when such an item is cleared. Therefore, especially when the vehicle has to be diagnosed in a short time in a shipping process from a factory or in a repair process before returning to a user from a vehicle dealer, such a long diagnosis time, for completing/satisfying all abnormality diagnosis items, is problematic.

SUMMARY

It is an object of the present disclosure to provide an electronic control unit having an improved serviceability for a user of a vehicle.

In one aspect of the present disclosure, an electronic control unit includes an abnormality determiner determining an abnormality of a vehicle by performing an abnormality diagnosis, a first storage, and storing a readiness information for use of the vehicle. The readiness information (i) indicates that the abnormality determiner has undergone all of a plurality of abnormality diagnosis items of the abnormality diagnosis and (ii) establishing that readiness is complete. The electronic control unit also includes a second storage (storing a history of the abnormality diagnosis, the history of the abnormality diagnosis including information of whether a normal history exists. The abnormality determiner applies a relaxed condition for the abnormality diagnosis, when the history of the abnormality diagnosis including the information of existence of the normal history is stored in the second storage at a time of determining the abnormality of the vehicle. The relaxed condition is more easily satisfied for completion of the readiness and the storing of the readiness information in the first storage, in comparison to a normal condition, when the history stored in the second storage is without the information of existence of the normal history.

By using the relaxed condition for the abnormality diagnosis, the abnormality determiner is enabled to more quickly store the readiness information in the first storage when performing the abnormality diagnosis, in which a satisfaction of the condition of each of many items of the abnormality diagnosis may otherwise be difficult (i.e., may otherwise take a long diagnosis time). Therefore, the diagnosis process is quickly completed, facilitating the repair process and enabling the user to more quickly receive a desired service.

In another aspect of the present disclosure, the abnormality determiner determines the abnormality of the vehicle without relaxing the condition for the abnormality diagnosis if the history stored in the second storage includes no normal diagnosis result, thereby performing the abnormality diagnosis according to a normal condition for the abnormality diagnosis. This enables the electronic control unit to find and determine an abnormality according to a normal flow of abnormality diagnosis.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure regarding the electronic control unit are described with reference to the drawings. In the following description, like numbers represent like parts or like functions, and the description of the like parts/functions is not repeated.

(First Embodiment)

Figure 1:
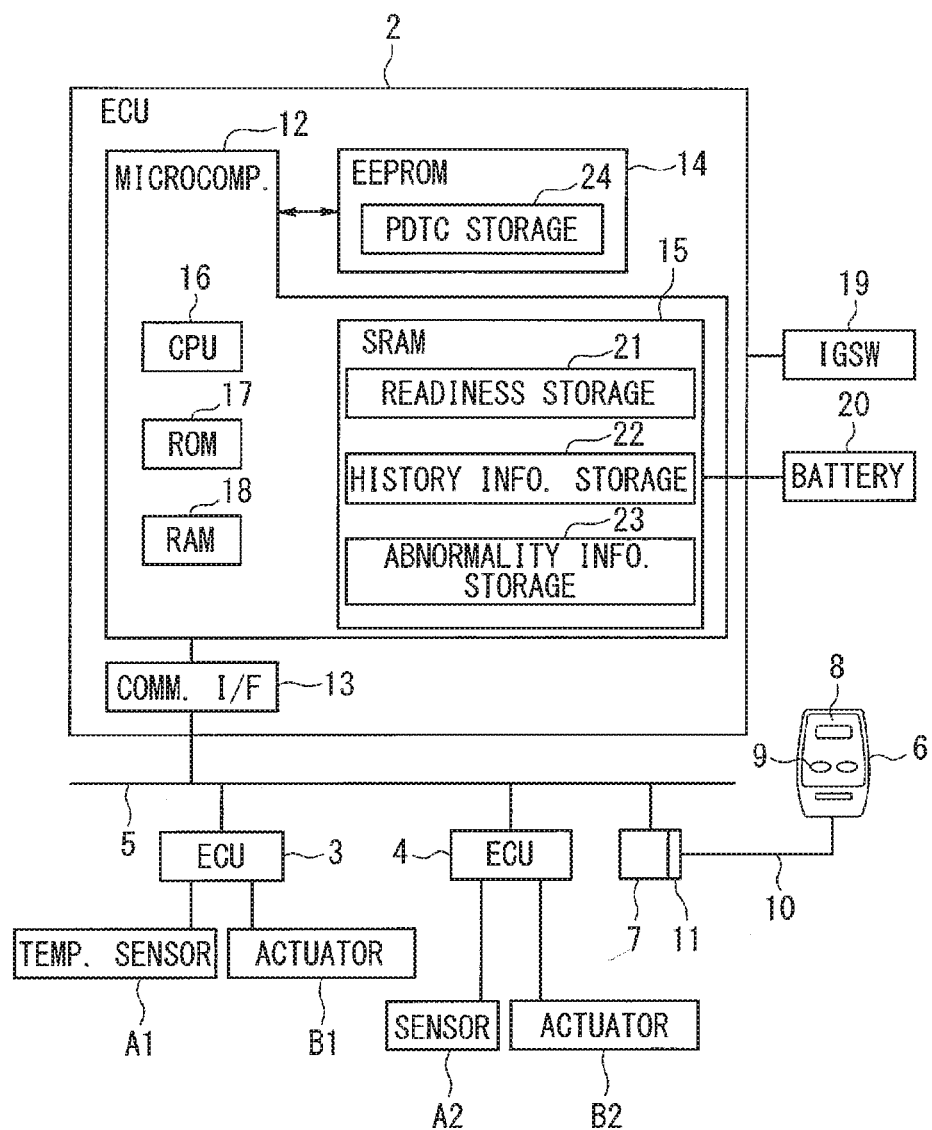
FIG. 1 is a block diagram of an electrical configuration of an electronic control unit and a communication system in a first embodiment of the present disclosure.
Figure 2:
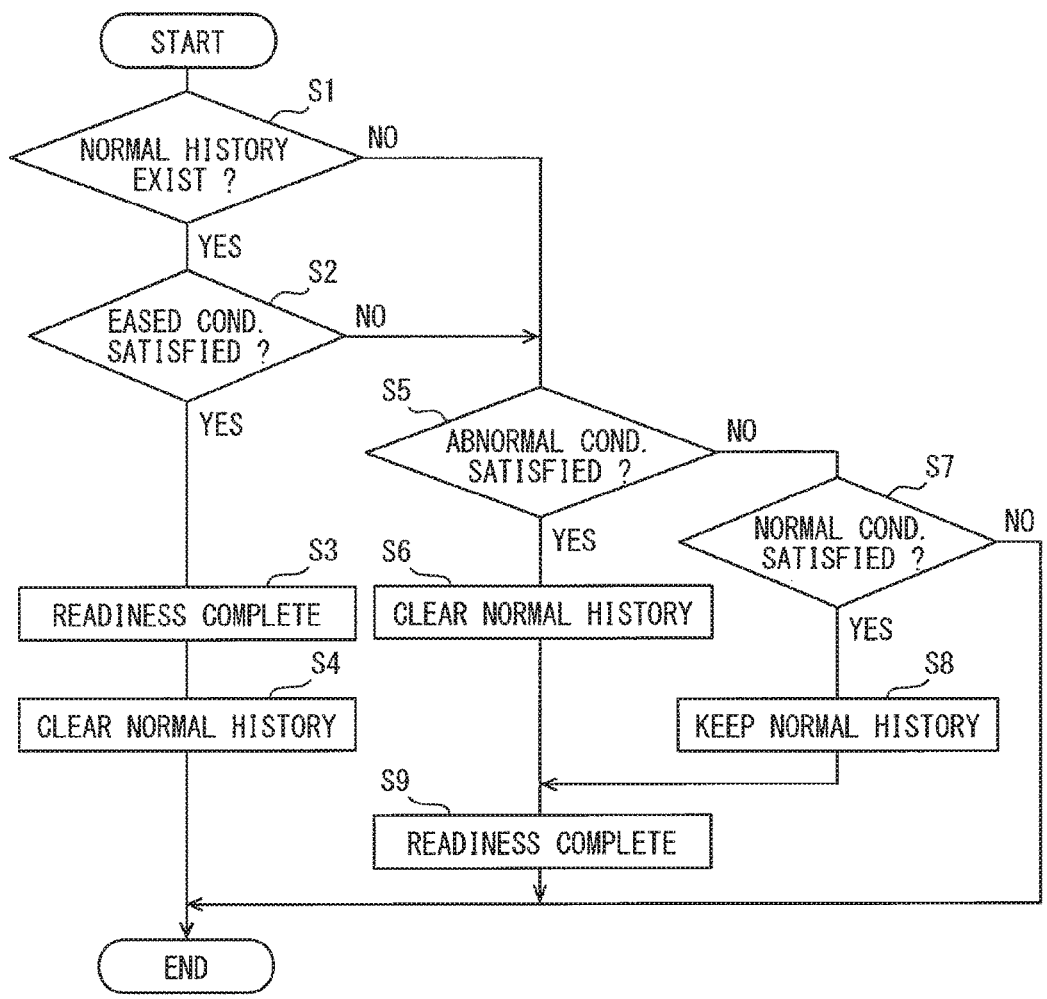
FIG. 2 is a flowchart of a first part of a diagnosis process in the first embodiment of the present disclosure.
Figure 3:
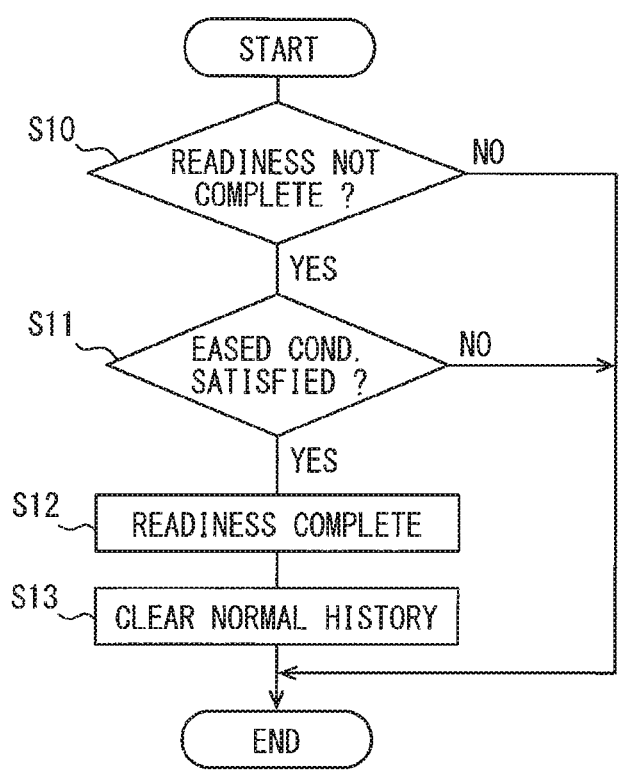
FIG. 3 is a flowchart of a second part of the diagnosis process in the first embodiment of the present disclosure.

FIGS. 1-3 are diagrams concerning the first embodiment of the present disclosure.

A communication system 1 shown in FIG. 1 is provided with a plurality of Electronic Control Units (ECU)s 2, 3, and 4 disposed in a vehicle, and ECUs 2 to 4 concerned are mutually-communicably connected via a communication line 5 of a vehicle network. Various kinds of sensors A1, A2 (e.g. a temperature sensor A1) and actuators B1, B2, etc., are connected to each of ECUs 3 and 4, and a plurality of ECUs 2 to 4 perform various controls in the vehicle by controlling these sensors A1, A2 and actuators B1, B2. A test port Data Link Connector (DLC) 7 that enables connection of a scan tool (i.e., equivalent to an external device) 6 from the outside of the vehicle is provided for the communication line 5.

The scan tool 6 has a liquid crystal display 8, a plurality of buttons 9, a cable 10, a connector 11, etc., for example, and is used by a worker of a vehicle manufacturer or a dealer when the worker connects the connector 11 to the test port 7 of the communication line 5. A plurality of buttons 9 may be, for example, an all delete button, a part delete button, an OK button and the like.

ECU 2 answers the scan tool 6 with the information relevant to abnormality diagnosis, etc. according to a command inputted via the communication line 5 from the scan tool 6. For example, a read-out of diagnosis information (i.e., Diagnostic Trouble Codes (DTC)) recorded on ECU 2 is performed by the scan tool 6, as well as erasure, a warning light control in the vehicle, a read-out of Vehicle Identification Number (VIN), a status display of a warning light (i.e., Malfunction Indicator Light (MIL)) and the like.

ECU 2 is provided with a microcomputer (i.e., microcomp.) 12, a communication interface 13, and Electrically Erasable Progammable Read-Only Memory (EEPROM) 14 as a nonvolatile storage device. The microcomputer 12 is provided with Central Processing Unit (CPU) 16 and Static Random-Access Memory (SRAM) 15 that serves as a backup Random Access Memory (RAM).

The microcomputer 12 is provided with the memories (e.g. CPU 16), Read-Only Memory (ROM) 17, RAM 18, and SRAM 15 as the backup RAM, and various kinds of functions are realized according to a processing of CPU 16 that executes memorized programs in the memory.

The microcomputer 12 functions, for example, as an abnormality determiner, a reception unit (e.g., receptor), and a clearing unit (e.g., clearer) by the execution of the memorized programs. The contents of RAM 18 may be erased when an ignition switch 19 is turned off, which interrupts a power supply from a battery 20 to RAM 18, and enables the reservation of a workspace at the time of execution of the program by CPU 16.

SRAM 15 is a volatile memory that continuously receives a power supply from the battery 20, and keeps the memory contents without being affected by a turn ON and OFF of the ignition switch 19.

SRAM 15 is used as an area for memorizing the abnormality related information. SRAM 15 is provided with a readiness storage area (i.e., a first storage) 21 that memorizes readiness, a history information storage area (an equivalent for the second storage) 22, and an abnormality related information storage area 23 that memorizes the diagnosis information (e.g., DTC) including the data when diagnosing an abnormality, or the like. In the drawing, the abnormality related information storage area 23 is shortened to "abnormality info. storage," the history information storage area 22 is shortened to "history info. storage," and the readiness storage area 21 is shortened to "readiness storage."

The readiness storage area 21 stores a readiness flag (i.e., abbreviated to "readiness" in the following description) that shows whether an abnormality diagnosis has been executed (i.e., completion/non-completion) for each type of abnormality diagnosis process that is performable by ECU 2.

The readiness (i.e., the storage of readiness) is the information that shows a completion of an abnormality diagnosis determination item or an abnormality diagnosis examination item (i.e., collectively abbreviated as an abnormality diagnosis item hereafter).

For example, according to the OBD II standard, many items are prefixed as a continuous monitor object and a regular (i.e., intermittent) monitor object.

As an item for the continuous monitoring, a misfire, a fuel system, an exhaust gas control system (i.e., an Air/Fuel (A/F) sensor), etc., may be included, and as an item for a regular monitoring, an exhaust gas recirculation system, an O2 sensor and its heater, a catalyst device, an evaporative gas discharge control device (i.e., an evaporation system), a secondary air supply system, an air conditioning system, etc. are included.

When the abnormality diagnosis of each of these items is performed, and the diagnosis of each of the abnormality diagnosis items is completed by the microcomputer 12, the microcomputer 12 memorizes completion of readiness in the readiness storage area 21 of SRAM 15.

The history information storage area 22 is an area that memorizes an abnormality diagnosis history (i.e., a normal history/an abnormal history) at an execution time of abnormality diagnosis processes, and the storage area 22 is provided in a corresponding manner to each type of the abnormality diagnosis processes regarding which the readiness is stored in the storage area 21. The abnormality diagnosis history may either be (i) a normal diagnosis history, or a normal history (i.e., a normal diagnosis result indicating that the abnormality diagnosis item is determined as normal) or (ii) an abnormal diagnosis history, or an abnormal history (i.e., an abnormal diagnosis result indicating that the abnormality diagnosis item is determined as abnormal).

The abnormality related information storage area 23 is provided as an area that stores and memorizes (i.e., keeps), abnormality diagnosis related information as the data in which an execution result of abnormality diagnosis is shown corresponding to readiness. The abnormality diagnosis related information represents, for example, that, as a result of diagnosis of each of the abnormality diagnosis items, i) abnormality found/exist, ii) no abnormality found/exist, iii)

existence of abnormality unknown, and, when the diagnosis abnormality related information is in a reset condition, the information represents "existence of abnormality unknown".

EEPROM 14 is a nonvolatile memory provided with a Permanent Diagnosis Information (PDTC) storage area 24 for memorizing PDTC as the information which should be permanently or everlastingly memorized from among the diagnosis information (e.g., DTC).

The microcomputer 12 performs a predetermined vehicle control by executing the program memorized in the memory, and performs the abnormality diagnosis about the vehicle control in parallel. Although the execution timing of the abnormality diagnosis process is different depending on the types of abnormality diagnosis, the microcomputer 12 may perform the diagnosis process immediately after a turn ON of the ignition switch 19 at a vehicle start time, based on an output signal of the various sensors, or may perform the abnormality diagnosis process at the vehicle travel time based on an execution result of the vehicle control.

Further, even while the ignition switch 19 is turned OFF, using a soak timer (not illustrated), the microcomputer 12 may be started and the abnormality diagnosis process may be performed. The microcomputer 12 may also perform the abnormality diagnosis process based on the comparison between a previous vehicle state (i.e., an output signal from various sensors, etc.) and a current vehicle state (i.e., an output signal from various sensors, etc.), both of which may be stored in SRAM 15, across a transition of driving cycles (i.e., when the ignition switch 19 is once turned OFF and then turned ON again) causing a transition of one driving cycle to the next cycle.

In other words, among many diagnosis items, some items take relatively-long time to diagnose, which means such items are difficult to diagnose, while other items take only a short time to diagnose. The long diagnose time required items are, for example, items related to a fuel injection system. That is, when a complicated or rare condition has to be satisfied for driving an injector in terms of diagnosis of certain item, such an assumption may be hard to realize, and the detection or determination of an abnormality of the injection under such drive condition may be difficult than other abnormalities. More practically, when a misfire is caused, a history of such abnormality, or more specifically, a history of how an abnormal condition is caused is memorized as the abnormal history, and, when such an abnormal history is stored in a memory, an item that determines whether a next misfire is caused or not based on a condition that an engine rotation number is within a misfired number range may relatively be hard to diagnose. This is because of a rarity of realizing a base condition. In this case, the engine rotation number to enter into a misfired number range again, and, while the base condition is not satisfied, the diagnosis of such item cannot be performed.

Further, a diagnosis item having the following operation scenario is also relatively difficult to diagnose. That is, after a continuation of constant speed travel of certain speed range (e.g., 40-50 km/h) for 10 seconds, an engine idle period is continued for a preset period (e.g., 60 seconds), which is a base condition of diagnosis, if a temperature sensor A1 for detecting an engine coolant temperature detects an over-threshold temperature change, such an outcome is diagnosed as a normal operation of the sensor A1, and, if the sensor A1 detects a less-than-threshold temperature change in the same situation, such an outcome is diagnosed as an abnormal operation of the sensor A1. The difficulty of diagnosis of the above item comes also from the rarity of the base condition (i.e., a simultaneous satisfaction of (i) a certain travel time at a certain speed and (ii) an engine idle period of preset time amount), which depends on a vehicle travel state and the like. Further, another difficult to diagnose item may be the one in which an abnormality diagnosis process is performed after a couple of hours from turning OFF of the ignition switch 19, during which no user operation is performed.

ECU 2 may be intermittently self-started for performing the abnormality diagnosis process after detecting a turning OFF of the ignition switch 19 by using a soak timer at a preset interval of a couple of hours or a couple of days. However, an abnormality diagnosis item of two conditions (i.e., (i) a first condition satisfied during an engine start time (i.e., at a previous start time for starting ECU 2) and (ii) a second condition, which is different from the first condition, satisfied during an engine stop time (i.e., at a present start time for starting ECU 2), may also be difficult to diagnose).

For example, a normal determination based on the following two conditions may be difficult. That is, the normal determination is based on (i) a first condition; when a temperature detection result of the temperature sensor A1 during an engine start time is equal to or greater than a first preset value (e.g., 40 degrees), and, (ii) a second condition; thereafter having no user operation after a stop of the engine and a detection result of water temperature sensor is less than a second preset value (e.g., 20 degrees). This is difficult to diagnose because it takes relatively long time to satisfy those conditions. Further, an item that requires a detection of a temperature change of an intake air besides detecting a temperature change of the engine coolant may also be relatively difficult to diagnose.

For performing an abnormality diagnosis process during an engine stop time without user operation, ECU 2 may be started by a soak timer during such time, and ECUS 2 to 4 are intentionally driven to control the actuators B1, B2 (e.g., for driving a heater of an air-fuel ratio (A/F) sensor, a heater of an O2 oxygen (O2) sensor, or a purge valve). That is, the abnormality diagnosis items that require actuator operations (i.e., actuators B1, B2) without user intervention may also be "difficult" items. Such items typically require several hours to several days of diagnosis time, and items other than the above may take only a short time to diagnose, which makes it easy to detect abnormality for those items.

The microcomputer 12 sets the readiness, which indicates completion of diagnosis of each of the various diagnosis items, to the readiness storage area 21 of SRAM 15, as the information which shows that the abnormality diagnosis has been performed and is complete. Then, the microcomputer 12 updates the contents of the abnormality diagnosis related information in SRAM 15 by the contents of the abnormality diagnosis result of the relevant diagnosis. Further, when an abnormality is caused, an alarm display lamp (not illustrated) is turned ON, for example, by the microcomputer 12, for reporting the abnormality to the occupant of the vehicle.

Further, when the scan tool 6 is connected to the communication line 5, an external request acceptance process is performed. In other words, when the microcomputer 12 stands by until receiving a certain request from the external device via the communication interface 13, and when a request signal is received, it performs a relevant process according to the received signal.

The output of the scan tool 6, or an external device, is used to instruct ECU 2 to clear the readiness memorized in SRAM 15 (i.e., is a code clear request to ECU 2). The code clear request is a command outputted towards the microcomputer 12 according to the user's operation of the scan tool 6, and one code clear request is output from the scan tool 6, for example, according to one button operation on the tool 6 by the user.

Hereafter, the action concerning the present embodiment is described.

The process of the microcomputer 12, when performing an abnormality diagnosis about vehicle controls, is illustrated in FIG. 2 as a flowchart. The process shown in FIG. 2 is performed for each of the abnormality diagnosis items. As shown in FIG. 2, for every abnormality diagnosis execution time, the microcomputer 12 determines whether a normal history exists in the history information storage area 22 (S1), and, when a normal history exists, or when the normal history is stored previously in the history information storage area 22 (S1:YES), the microcomputer 12 determines whether a relaxed condition of an abnormality diagnosis item is satisfied (S2) (i.e., in FIG. 2, an "eased condition" is used instead of relaxed).

When the microcomputer 12 performs an abnormality diagnosis using a relaxed condition, which is more easily satisfied than a standard condition, and the relaxed condition is satisfied (S2:YES), readiness is considered as complete (S3). After performing Step S3, the microcomputer 12 clears a normal history of this abnormality diagnosis item (S4).

On the other hand, the microcomputer 12 performs a normal abnormality diagnosis without using the relaxed condition (S5-S9), when no normal history exists, the microcomputer 12 is without normal history that is stored previously in the history information storage area 22 (S1:NO). When performing the normal abnormality diagnosis (S5-S9), the microcomputer 12 determines whether an abnormal condition of the abnormality diagnosis item is satisfied (S5), and, if the abnormal condition is satisfied (S5:YES), the microcomputer 12 clears the normal history in the history information storage area 22 (S6). Satisfaction of the abnormal condition means that an abnormal operation of the sensors A1, A2, etc. is confirmed.

On the contrary, when performing the abnormality diagnosis, upon determining that a normal condition is satisfied (S7:YES), the microcomputer 12 keeps (i.e., stores and memorizes) the satisfaction of the normal condition as a normal history to the history information storage area 22 (S8). Satisfaction of the normal condition means that a normal operation of the sensors A1, A2 etc., is confirmed.

Further, the microcomputer 12 considers that readiness is complete, when either of the normal condition or the abnormal condition of the abnormality diagnosis item is satisfied (S9).

Further, when readiness is incomplete after NO in Step S7 of FIG. 2 (S10:YES), the microcomputer 12 considers that readiness is complete upon having YES in S11 of FIG. 3, which means that the relaxed condition of the abnormality diagnosis item is satisfied, and sets that readiness is complete (S12), and clears the normal history (S13). Otherwise, the process is finished (S10:NO or S11:NO).

Hereafter, an example is described. When the ignition switch 19 of the vehicle is turned ON, the engine starts and is put in a warm-up state. CPU 16 of the microcomputer 12 detects that a first prescribed time (e.g., a certain number of seconds) has passed after the start of the engine by using a timer (not shown), for example, and determines whether a travel distance is equal to or greater than a first prescribed distance. In case that no abnormal state is caused even after these prescribed conditions are satisfied, CPU 16 determines that the normal condition is satisfied (S7:YES), and stores, to SRAM 15, history information that the normal history exists (S8).

Although satisfaction of the "prescribed conditions" is determined only once (i.e., in one cycle) in the above-described example, satisfaction of the prescribed conditions (i.e., after a first prescribed time from a start of an engine, and a travel distance is equal to or greater than a first prescribed distance) may be repeatedly determined many times for determining that the normal condition is satisfied.

Then, the microcomputer 12 performs the abnormality diagnosis with the application of the relaxed condition at the time of performing the next abnormality diagnosis (i.e., S1-S4 in the next cycle). The relaxed condition in the next cycle may be a second prescribed time, which is configured to be smaller than the first prescribed time, and a second prescribed distance, which is smaller than the first prescribed distance.

Since the microcomputer 12 determines that, as history information, the normal history exists (S1:YES), in case that the no abnormal state is caused even after the second prescribed time from a start of the engine and at a travel distance equal to or greater than the second prescribed distance, it is determined that the relaxed condition is satisfied (S2:YES), and that readiness is complete (S3). Then, the normal history memorized in SRAM 15 is cleared (S4). In such manner, when the relaxed condition of the abnormality diagnosis is satisfied, readiness is considered as complete.

According to the above, when the normal history exists, the diagnosis of the abnormality is performed by using the relaxed condition for the abnormality diagnosis items, and upon determining that the relaxed condition is satisfied, the readiness is considered as complete. That is, it does not take a long time to complete readiness (i.e., ease of readiness completion is achieved).

The relaxed condition may be set in various ways/manners other than the above-described example, and relaxed condition may be applicable to what kind of abnormality is configured in advance. Further, the relaxed condition of the abnormality diagnosis item may be uniformly determined for the entire system as a single condition, or may be determined as respectively different conditions item to item.

Further, when the relaxed condition of the abnormality diagnosis item is not satisfied (S2:NO), the microcomputer 12 considers that readiness is complete (S9) when the abnormal condition of the abnormality diagnosis item is satisfied (S5:YES), or when the normal condition of the abnormality diagnosis item is satisfied (S7:YES).

As described above, according to the present embodiment, when performing the abnormality diagnosis of a vehicle, the microcomputer 12 uses the relaxed condition, (i.e., an easily-satisfied condition), of the abnormality diagnosis item for a determination that readiness is complete (S2) in case that the history information in the history information storage area 22 has the normal history. Therefore, the completion of readiness is easily achievable. Further, even when the satisfaction of the condition of the abnormality diagnosis/inspection item takes a long time, or is difficult, readiness becomes easily storable in the readiness storage area 21 according to the above. Therefore, the readiness completion process is facilitated and the user of the vehicle receives a service more quickly.

Further, if the history information memorized in the history information storage area 22 indicates that no normal history exists when the microcomputer 12 performs the abnormality diagnosis of a vehicle, the abnormality diagnosis is performed without using a relaxed condition of the abnormality diagnosis item. This means that the abnormality of a vehicle is discovered according to a normal flow of abnormality diagnosis.

Further, if the history information memorized in the history information storage area 22 indicates that the normal history exists (S1:YES), the microcomputer 12 may consider that readiness is complete (S3) when the relaxed condition of the abnormality diagnosis item is satisfied (S2:YES), and, when the relaxed condition of the abnormality diagnosis item is not satisfied (S2:NO), the microcomputer 12 may consider that readiness is complete (S9) (i) when the abnormal condition of the abnormality diagnosis item is satisfied (S5:YES) or (ii) when the normal condition of the abnormality diagnosis item is satisfied (S7:YES), leading to a determination that readiness in the readiness storage area 21 is complete.

The microcomputer 12 may determine satisfaction/non-satisfaction of the abnormal condition and the normal condition of the abnormality diagnosis item, and may clear the normal history when the abnormal condition is satisfied (S6), or may keep the normal history (i.e., may keep the history information that indicates that the normal history exists), when the normal condition is satisfied (S8).

(Second Embodiment)

Figure 4:
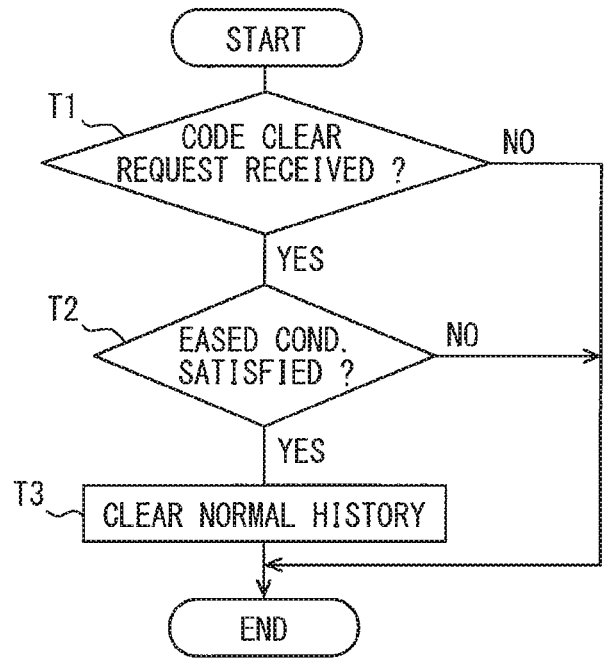
FIG. 4 is a flowchart of the diagnosis process in a second embodiment of the present disclosure.

FIG. 4 is an additional diagram (i.e., a flowchart) of the second embodiment. The second embodiment describes a process at the time of receiving a code clear request. The scan tool 6 is capable of outputting a code clear request to ECU 2. The code clear request is a command outputted toward the microcomputer 12 according to an operation of the button 9 of the scan tool 6 by a user, and one code clear request is output by one operation of the button 9 of the scan tool 6 by the user, for example. In the present embodiment, the microcomputer 12 executes a program memorized by the memory, and serves as an abnormality determiner, a reception unit, and a clearing unit.

When the scan tool 6 outputs a code clear request to ECU 2 according to the user's operation, the microcomputer 12 of ECU 2 receives the code clear request (T1:YES). Then, the microcomputer 12 determines whether the relaxed condition of the abnormality diagnosis item (i.e., an eased condition) is satisfied (T2). When the eased condition is satisfied (T2:YES), the normal history in the history information storage area 22 is cleared (T3). When the eased condition is not satisfied (T2:NO), the process is finished, without clearing the normal history in the history information storage area 22.

According to the present embodiment, even when the microcomputer 12 receives a code clear request, the normal history is cleared based further on a certain condition (i.e., when the eased condition is satisfied), and the normal history is not cleared when the eased condition is not satisfied. In other words, such a clearing scheme makes it harder to perform the clearing of the normal history in the history information storage area 22, thereby making it unnecessary to re-establish the normal history (i.e., time to re-diagnose the abnormality diagnosis item(s) to record the normal history is not required).

(Third Embodiment)

Figure 5:
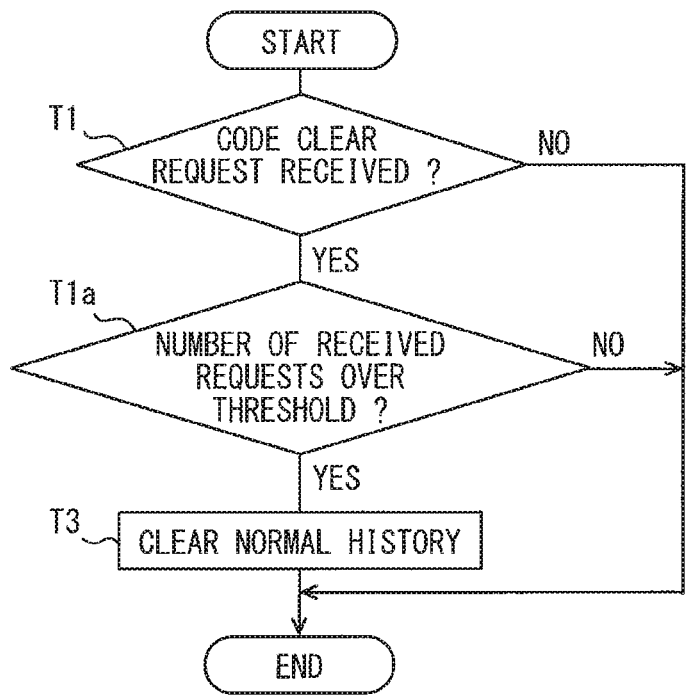
FIG. 5 is a flowchart of the diagnosis process in a third embodiment of the present disclosure.

FIG. 5 is an additional diagram (i.e., a flowchart) of the third embodiment. The third embodiment describes a modification of the second embodiment. According to the present embodiment, the microcomputer 12 executes a program memorized by the memory, and serves as a component functioning as the abnormality determiner, the reception unit, and the clearing unit.

As shown in FIG. 5, when the scan tool 6 outputs a code clear request to ECU 2 according to the user's operation, the microcomputer 12 of ECU 2 determines whether the microcomputer 12 has received a code clear request (T1), and, based on the number of receptions of the code clear request (i.e., when the number of receptions of the code clear request reaches a threshold (T1a:YES)), the microcomputer 12 clears the normal history in the history information storage area 22 (T3). The microcomputer 12 concludes the process without clearing the normal history when the number of receptions of the request is other than the above (T1, T1a:NO).

As shown in the present embodiment described above, the normal history may be cleared based on a condition of the number of receptions of the code clear request received by the microcomputer 12, and the normal history may be not cleared based on a condition other than the above.

(Fourth Embodiment)

Figure 6:
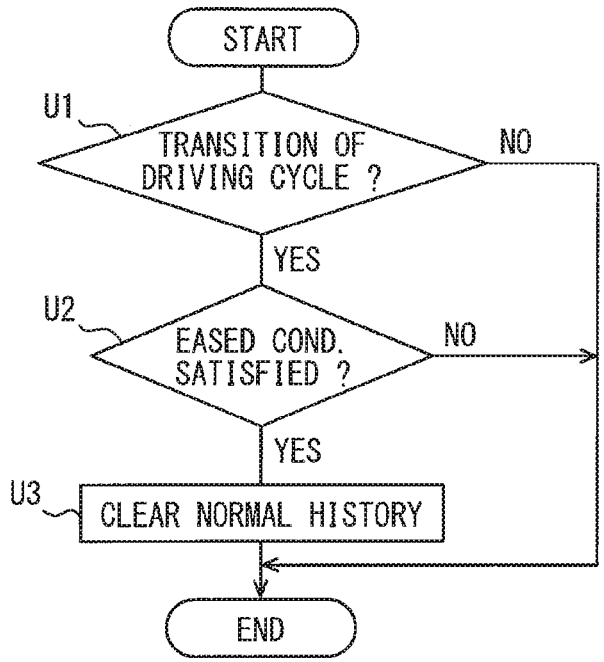
FIG. 6 is a flowchart of the diagnosis process in a fourth embodiment of the present disclosure.

FIG. 6 is an additional diagram (i.e., a flowchart) of the fourth embodiment. The fourth embodiment describes a transition process of transitioning a driving cycle. According to the present embodiment, the microcomputer 12 executes a program memorized by the memory, and serves as a component functioning as the abnormality determiner, a driving cycle determiner, and the clearing unit.

As shown in FIG. 6, the microcomputer 12 determines whether the driving cycle has transitioned (U1). The driving cycle is a cycle that transitions when an operation of a vehicle is started (e.g., when the ignition switch 19 is turned from OFF to ON).

When it is determined by the microcomputer 12 that the ignition switch 19 is turned from OFF to ON, it is determined that a driving cycle has transitioned (i.e., has changed) (U1).

When the microcomputer 12 determines that the driving cycle has transitioned (U1:YES), the microcomputer 12 then determines whether the relaxed condition of the abnormality diagnosis item (i.e., an eased condition) is satisfied (U2).

When the eased condition is satisfied in the above determination, the microcomputer 12 clears the normal history in the history information storage area 22 (U3). When the eased condition is not satisfied (U2:NO), the process is finished, without clearing the normal history in the history information storage area 22.

According to the present embodiment, when the microcomputer 12 determines that the driving cycle has transitioned to the next driving cycle, and when the transition to the next driving cycle is determined, the microcomputer 12 clears the normal history based on a condition that the eased condition is satisfied. This means that, when the eased condition is not satisfied, the normal history is not cleared. That is, the normal history may be kept non-cleared/un-erased until the driving cycle transitions, as shown in the present embodiment.

In addition, when the history information storage area 22 is provided in RAM 18 etc. (not illustrated), after a turning OFF of the ignition switch 19, for example (i.e., during an engine stop time), the normal history of the abnormality diagnosis item memorized in the history information storage area 22 is held (i.e., is kept non-cleared/un-erased).

(Fifth Embodiment)

Figure 7:
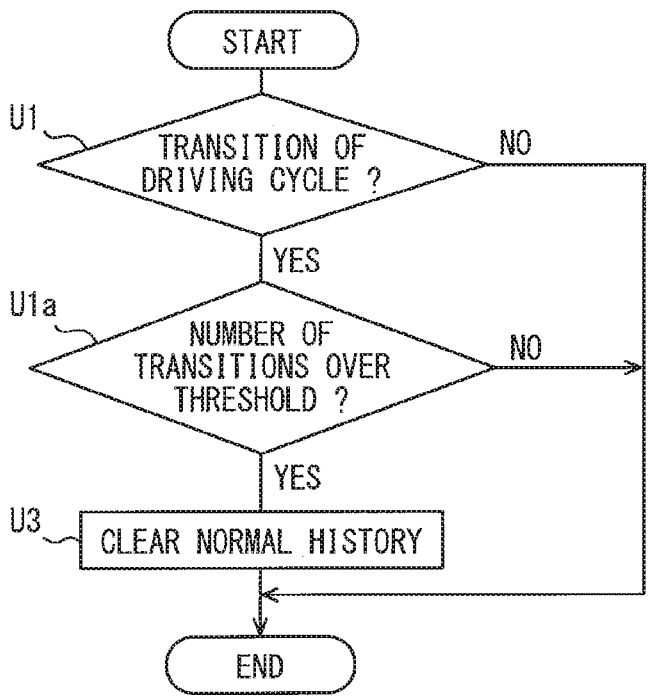
FIG. 7 is a flowchart of a first part of the diagnosis process in a fifth embodiment of the present disclosure.
Figure 8:
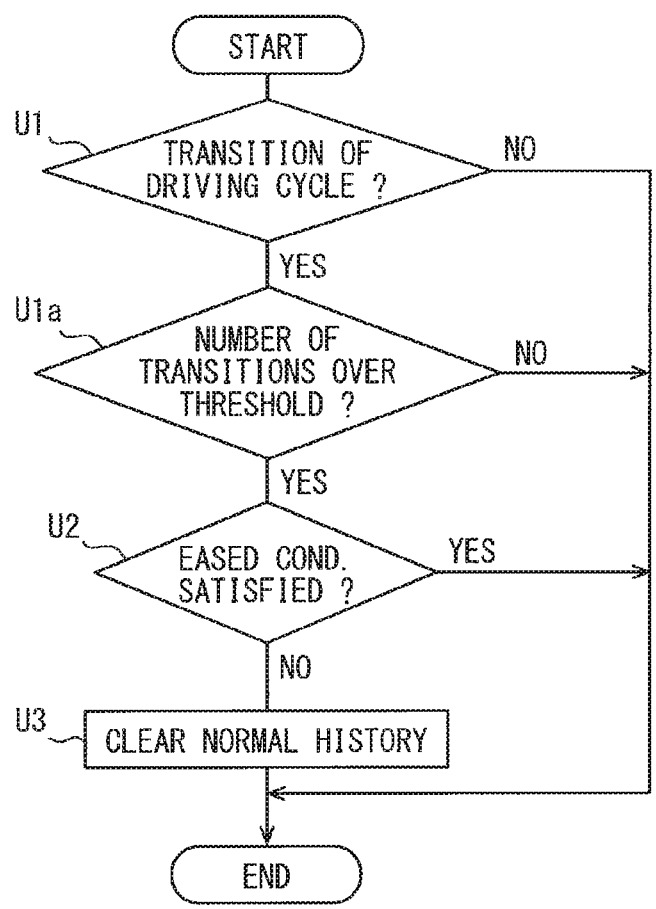
FIG. 8 is a flowchart of a second part of the diagnosis process in the fifth embodiment of the present disclosure.

FIGS. 7 and 8 show additional diagrams (i.e., flowcharts) of the fifth embodiment.

The fifth embodiment is a modification of the fourth embodiment. According to the present embodiment, the microcomputer 12 executes a program memorized by the memory, and serves as a component functioning as the abnormality determiner, the driving cycle determiner, and the clearing unit.

As shown in FIG. 7, the microcomputer 12 determines whether the driving cycle has transitioned (change) (U1), and, based on a condition that the driving cycle has transitioned by a preset number of times (e.g., 10 times) (U1a: YES), clears the normal history in the history information storage area 22 (U3).

The microcomputer 12 finishes the process without clearing the normal history in the history information storage area 22, when the condition is other than the above (U1:NO or U1a:NO).

According to the present embodiment, the microcomputer 12 clears the normal history based on a condition that the driving cycle has transitioned by a preset number of times in total, and does not clear the normal history in other cases. In other words, the normal history may be kept non-cleared/un-erased until the driving cycle transitions by a preset number of times, as described in the present embodiment.

By implementing the above-described normal history clearing scheme, a reliability of the information stored in the history information storage area 22 is improved, because, after a certain number of transitions of the driving cycle, it is highly possible that the vehicle state (i.e., a normal or an abnormal state of the sensors A1, A2) has been changed. That is, by clearing the falsely "optimistic" normal history, the stored information regarding the abnormality diagnosis becomes more reliable.

In addition, when the history information storage area 22 is provided in RAM 18, etc. (not illustrated), after a turning OFF of the ignition switch 19, for example (i.e., during an engine stop time), the normal history of the abnormality diagnosis item memorized in the history information storage area 22 is held (i.e., is kept non-cleared/un-erased) as long as possible.

Further, a determination step for determining whether the eased condition is satisfied (i.e., Step U2 in FIG. 6) may be inserted at a certain position ahead of Step U3 in FIG. 7. By inserting U2 of FIG. 6 into such a position, the reliability of the memory contents in the history information storage area 22 is improved/assured according to the following logic. That is, when the eased condition is not satisfied (U2:NO) after many transitions of the driving cycle (i.e., after a travel of the vehicle for a long distance), the normal history in the memory may possibly be a false positive (i.e., may be not reliable). Therefore, such false positive memory contents in the storage area 22 would better be cleared for the improved reliability of the memory contents.

(Sixth Embodiment)

Figure 9:
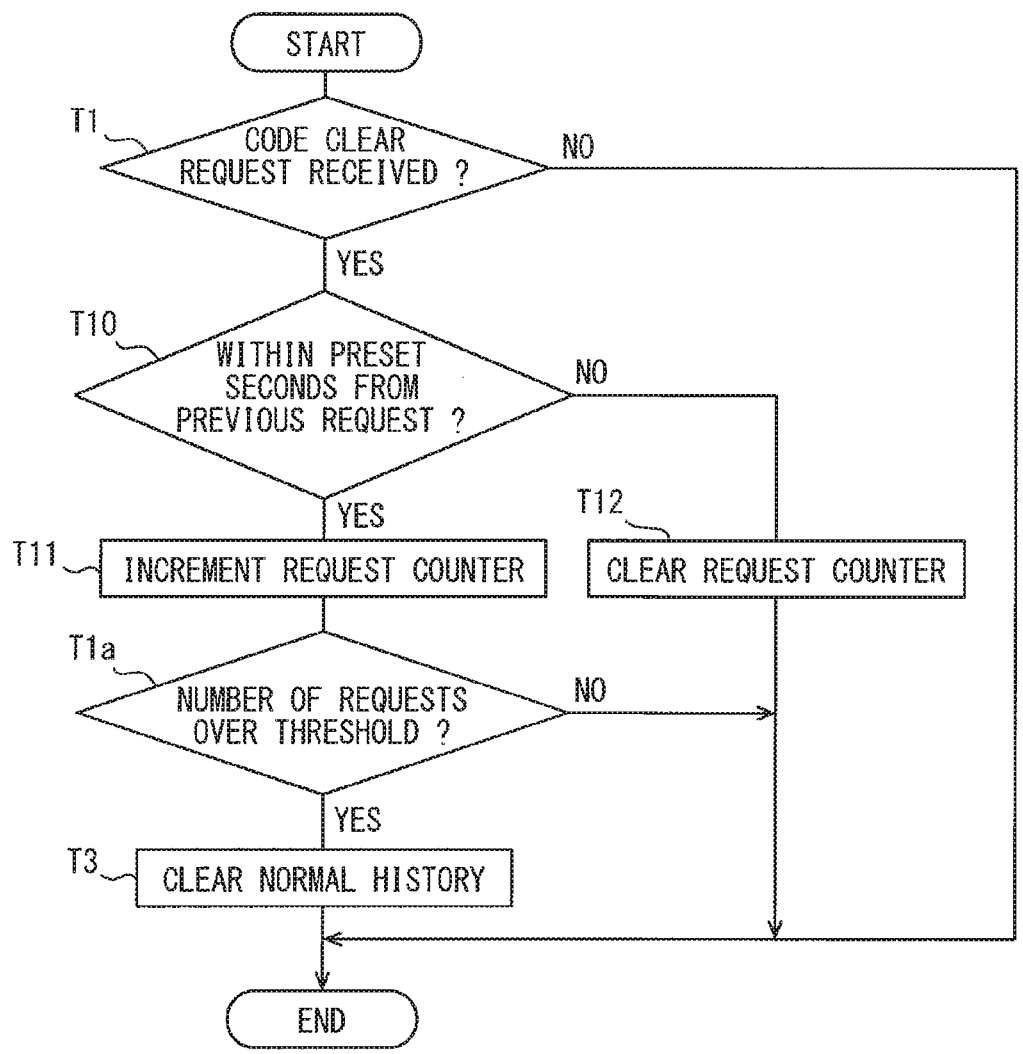
FIG. 9 is a flowchart of the diagnosis process in a sixth embodiment of the present disclosure.

FIG. 9 is an additional diagram, (i.e., a flowchart), of the sixth embodiment. Since the sixth embodiment is a modification of the second embodiment or the third embodiment, the step numbers of T1 T1a-T3 of FIGS. 4 and 5 are borrowed and are used in FIG. 9. According to the present embodiment, the microcomputer 12 executes a program memorized by the memory, and serves as a component functioning as the abnormality determiner, the reception unit, a timer, and a counter.

As shown in FIG. 9, the microcomputer 12 of ECU 2 receives a code clear request when the scan tool 6 outputs a code clear request to ECU 2 (T1). The code clear request is a command that is outputted once according to one depression of the button 9 which may be a request button or a confirmation button and is outputted once again according to one depression of the button 9 (e.g., of the confirmation button or the like).

When receiving the code clear request, the microcomputer 12 measures a time from such a reception of the code clear request by using a timer (not illustrated), and determines whether an interval between the two requests (i.e., from the previous request to the current request) is less than a preset number of seconds (T10).

Further, the microcomputer 12 increments the counter (+1) (T11) when a T10 condition is satisfied (T10:YES), and determines whether the number of code clear requests reaches a preset value of threshold (T1a).

The microcomputer 12 clears the normal history in the history information storage area 22 (T3), when the number of requests reaches the preset value (T1a:YES). On the other hand, the microcomputer 12 does not clear the normal history in the history information storage area 22, when the reception of the code clear requests is not within the preset number of seconds from the previous request (T10:NO) or when the number of requests has not reached the preset value of threshold (T1a:NO). Further, when the reception of the code clear request is not within the preset number of seconds from the previous request (T10:NO), the microcomputer 12 clears the number of code clear requests (i.e., the microcomputer 12 resets the counter that counts the number of code clear requests (T12)).

According to the present embodiment, the microcomputer 12 measures a time between two code clear requests (i.e., from the reception of the previous code clear request to the reception of the current code clear request), and based on a condition that the measured time is within a preset amount of time, the reception of the current code clear request is validated (i.e., increment the counter counting the requests). Then, based on the present number of requests in total, the normal history in the history information storage area 22 is cleared, and the normal history is not otherwise cleared. That is, when the above-described conditions are not satisfied, the normal history is not cleared.

(Other Embodiments)

The above-mentioned embodiments may further be modified or expanded.

Although, in the above-mentioned embodiments, varieties of information (e.g., readiness, the history information, the abnormality diagnosis related information, etc.) is stored in SRAM 15, which functions as a backup RAM, such information may be stored in other memories (e.g., in a normal RAM 18), a non-volatile memory (e.g., EEPROM) other than the above.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. An electronic control unit comprising:
   an abnormality determiner configured to determine an abnormality of a vehicle by performing an abnormality diagnosis;
   a first storage configured to store a readiness information, the readiness information (i) indicating that the abnormality determiner has performed the abnormality diagnosis for all of a plurality of abnormality diagnosis items and (ii) indicating that the readiness information is complete; and
   a second storage configured to store a history of the abnormality diagnosis, the history of the abnormality diagnosis including information of whether a normal history exists indicating that a normal condition of one of the abnormality diagnosis items is satisfied, wherein the abnormality determiner is further configured to determine whether the history of the abnormality diagnosis including the information of existence of the normal history is stored in the second storage when the abnormality determiner performs the abnormality diagnosis, use a relaxed condition in place of the normal condition for the abnormality diagnosis item during the abnormality diagnosis when the history of the abnormality diagnosis including the information of existence of the normal history is stored in the second storage, wherein when the abnormality determiner uses the relaxed condition during one or more controls being performed in the vehicle while performing the abnormality diagnosis, the abnormality determiner completes and stores the readiness information more quickly using the relaxed condition than when the abnormality determiner uses the normal condition while performing the abnormality diagnosis, wherein the relaxed condition has fewer items and/or more easily completed items than the normal condition.

2. The electronic control unit of claim 1, wherein the abnormality determiner uses the normal condition when performing the abnormality diagnosis, when the abnormality determiner determines that the history of the abnormality diagnosis including the information of existence of the normal history is not stored in the second storage.

3. The electronic control unit of claim 1, wherein the abnormality determiner determines that the readiness information is complete, in a case that the history of the abnormality diagnosis stored in the second storage includes the information of existence of the normal history, and when the relaxed condition for the abnormality diagnosis is satisfied, and upon having satisfied one of an abnormal condition and the normal condition for the abnormality diagnosis, even when the relaxed condition for the abnormality diagnosis is unsatisfied.

4. The electronic control unit of claim 2, wherein after determining whether an abnormal condition for the abnormality diagnosis is satisfied the abnormality determiner sets the history to include the information that the history is without the normal history by clearing the history, in case that the abnormal condition is determined as satisfied, and after determining whether the normal condition for the abnormality diagnosis is satisfied, the abnormality determiner sets the history to include the information of existence of the normal history, in case that the abnormal condition is determined as unsatisfied.

5. The electronic control unit of claim 1, wherein the abnormality determiner is configured to include:

a reception unit receiving a code clear request from an external device; and a clearing unit clearing the history stored in the second storage when (i) the reception unit has received the code clear request and (ii) the history stored in the second storage includes the information of existence of the normal history, and the clearing unit clears the history including the information of existence of the normal history in the history, upon determining that the relaxed condition for the abnormality diagnosis is satisfied, when the reception unit has received the code clear request.

6. The electronic control unit of claim 1, wherein the abnormality determiner is configured to include:

a reception unit receiving a code clear request from an external device; and a clearing unit clearing the history from the second storage, when a number of the code clear requests received by the reception unit is equal to or greater than a preset value, after the storing of the history of the abnormality diagnosis in the second storage, the stored history of the abnormality diagnosis including the information of existence of the normal history.

7. The electronic control unit of claim 1, wherein the abnormality determiner is configured to include:

a driving cycle determiner determining whether a driving cycle has transitioned to a next cycle; and a clearing unit clearing the normal history when the driving cycle determiner determines that the driving cycle has transitioned to the next cycle, and the clearing of the normal history is further based on satisfaction of the relaxed condition for the abnormality diagnosis.

8. The electronic control unit of claim 1, wherein the abnormality determiner is configured to include:

a driving cycle determiner determining whether a driving cycle has transitioned to a next cycle; and a clearing unit clearing the normal history when the driving cycle determiner determines that the driving cycle has transitioned to the next cycle for a preset number of times.

9. The electronic control unit of claim 8, wherein the clearing unit clears the normal history based on a condition that the relaxed condition for the abnormality diagnosis is unsatisfied.

10. The electronic control unit of claim 1, wherein the abnormality determiner is configured to include:

a reception unit receiving a code clear request from an external device;

a timer measuring a time interval between one reception of the code clear request and a next reception by the reception unit; and a counter counting a number of the code clear requests within a preset time interval that is measured by the timer, and the information of existence of the normal history in the history is cleared based on a condition that the number of the code clear requests counted by the counter is equal to or greater than a preset threshold, when the history of the abnormality diagnosis stored in the second storage includes the information of existence of the normal history.

11. The electronic control unit of claim 1, wherein the readiness shows whether an abnormality diagnosis has been completed.

12. The electronic control unit of claim 1, wherein the readiness comprises information that shows the completion of the plurality of abnormality determination items.

13. The electronic control unit of claim 1, wherein the abnormality determiner is further configured to control operation of at least one actuator of the vehicle during the normal condition and during the relaxed condition.

* * * * *